United States Patent [19]

Barnsley

[11] Patent Number: 5,717,788
[45] Date of Patent: Feb. 10, 1998

[54] METHOD AND SYSTEM FOR ANALYZING DATA

[75] Inventor: Michael F. Barnsley, Duluth, Ga.

[73] Assignee: Iterated Systems, Inc., Atlanta, Ga.

[21] Appl. No.: 423,837

[22] Filed: Apr. 18, 1995

[51] Int. Cl.$^6$ .............................. G06K 9/36; G06K 9/46
[52] U.S. Cl. .......................................... 382/249; 382/239
[58] Field of Search ............................. 382/192, 228, 382/249, 276, 293, 239; 358/467

[56] References Cited

U.S. PATENT DOCUMENTS

| | | | |
|---|---|---|---|
| 4,941,193 | 7/1990 | Barnsley et al. | 382/249 |
| 5,065,447 | 11/1991 | Barnsley et al. | 382/249 |
| 5,321,764 | 6/1994 | Cullen et al. | 382/110 |
| 5,347,600 | 9/1994 | Barnsley et al. | 382/249 |
| 5,416,848 | 5/1995 | Young | 382/276 |

OTHER PUBLICATIONS

Warren et al., Using Chaos to Characterise Tape Noise, Apr. 1994, pp. 76–80, IEEE.
Antognetti et al., Fractal Analysis for Discrimination of Overlapped Structures in Radiological Images, 1988, pp. 349–350.

*Primary Examiner*—Joseph Mancuso
*Assistant Examiner*—Timothy M. Johnson

[57] ABSTRACT

A system and method for analyzing a set of data elements is disclosed. The method includes the steps of transforming data elements of a transform data space using the states of data elements comprising a data set and determining whether the transformed data elements have structure in the transform data space. The transformation of the data elements is performed by iteratively selecting mapping transformations corresponding to the states of successive data elements in the data set and applying the mapping transformations to successive transformations in the transform data space. By viewing the transformations in the transform data space, structure may be ascertained and evaluated to obtain information about the data set. The inventive system includes a transformer that changes state in response to the state of the next data element received from the data set and transforms the last transformation stored in the transform data space.

2 Claims, 2 Drawing Sheets

METHOD AND SYSTEM FOR ANALYZING DATA

FIELD OF THE INVENTION

This invention relates to data analysis, and more particularly, to the transformation of a data set to analyze data comprising a data set.

BACKGROUND OF THE INVENTION

Compression of data is an increasingly important aspect of computer resource management. As the hardware for computer resources, such as memory devices, increase in capacity and speed, application programs have been developed which utilize that capacity and speed. Even though such resources appear to be more than adequate for application programs when the components are first made available, application programs are soon developed which test the limits of the speed and capacity of such devices. One way to regain a portion of the capacity or speed of a hardware device is to compress the data being stored or communicated in the system. Compression is a method which represents a set of data elements with a number of elements fewer than the number of data elements in the original set.

For example, compressed data requires less memory for storage than uncompressed data. Storage and retrieval of compressed data also takes less time because there are fewer elements in CD-ROMs. In applications where the data remains fixed, such as CD-ROMs, as long as the time to decompress the data is less than the time to retrieve the uncompressed data, retrieval time is reduced.

The compression of data is also important in the communication of data between locations. Compression reduces the number of data elements that need to be communicated in local systems such as local area networks (LAN) or the like and in distributed systems having remote sites which require the use of telephone utilities or wireless communication methods to communicate data. Each type of system uses a communication conduit which has a natural bandwidth that limits the amount of data that may be communicated through the conduit. As a result, efforts are continually being directed at ways to increase the amount of data that may be communicated within the bandwidth of a conduit. Data compression is one way to deal with the bandwidth of communication conduits.

There are generally two types of data compression—lossless and lossy. In lossless compression methods, decompression of the compressed data regenerates each data element that was present in the data set prior to compression. In lossy data compression and decompression, a representation of the original data set is generated but each element in the data set prior to compression is not necessarily regenerated.

The Lempel-Ziv and Lempel-Ziv-Welch data compression techniques represent lossless data compression techniques which have been well received in the computer industry. However, data compression techniques which follow the teachings of Lempel-Ziv and Lempel-Ziv-Welch utilize data dictionaries or look ahead buffers which may tax the capacity and speed of computer resources used to compress such data. Additionally, these methods only achieve compression ratios of approximately 1.5:1 or 2:1. Accordingly, there have been efforts to further enhance lossless data compression techniques in such a way as to more efficiently utilize computer resources.

Lossy data compression techniques include fractal transform methods and iterated mapping systems which represent large sets of data with a set of parameters for a method which transforms a random set of data into an attractor that accurately represents the original set of data. The selection of the appropriate transforming method and parameters which generate an attractor that best corresponds to the original set of data is important. Such techniques are well adapted to the representation of graphical data where close approximation to the original image suffices. These techniques typically result in compression ratios of approximately 30:1.

Data compression methods, regardless of the type used, yield different representations for different data sets because the data elements comprising a data set differ from data set to data set. One compression technique which may be particularly efficient for one data set may not yield an efficient compression for a second data set. Thus, the data elements for a data set uniquely identify the data set and its properties such as its compressibility, content, or organization.

Currently, information about a data set is most frequently learned by trial and error techniques. For example, whether a set of data elements may be efficiently compressed by a particular compression technique may be evaluated by applying the technique and evaluating the efficiency of the compression achieved for the set of data elements. Such a method does not provide insight into how or why the technique worked or failed but rather merely demonstrates that the technique worked or failed.

Another method for analyzing a data set to determine properties of the set is to place the data elements in a data space such as a Cartesian coordinate system and attempt to find a function that approximates the data set by classical curve fitting methods or the like. Another technique is to transform the representation of a data set to another data domain. For example, the transformation of a data set defined by a time domain function may be converted to a frequency domain function by a Laplace transform to facilitate solving the time domain function. While these methods provide more insight into the data set than the a posteriori methods discussed above, they suffer from the limitations that they assume or require a data function in one data space or domain before they can be used to transform the data set to another data space or domain. When the function that defines the data set in the first data space or domain is difficult to ascertain or does not exist, the data analysis available from these methods is severely restricted.

One of the few predictive methods to discern the properties of a data set is to measure the entropy of a data set by known techniques. Frequently, entropy is measured to determine whether a data set may be compressed. However, such entropy measurements suffer from the limitations that they cannot predict whether one compression technique is better than another for a given set of data nor can they provide information for improving a particular compression technique for a particular set of data. Finally, entropy measurement is a quantitative measurement which is more useful for go/stop decisions but is not as useful for providing insight into information about the data set which may be exploited.

What is needed is a way to analyze a data set to get information that may be used to improve a compression method or to design a new compression method. What is needed is a way to determine the properties of a data set for evaluating the content, organization or other parameters of the data set. What is needed is a way for humans to learn the properties of a data set by observation or other simple, intuitive techniques.

SUMMARY OF THE INVENTION

The above identified problems are solved by an inventive method and system for analyzing a set of data elements. The inventive method is comprised of the steps of transforming a set of data elements to a transform data space and determining whether the transformed set of data elements has structure in the transform data space. The structure of the transformed data set in the transform data space may be perceived without insight or knowledge of the transformation method. Yet the structure provides information which is not apparent from the data elements in the original data space. Thus, the transformation of the original data set provides more information about the data set. This information may be used to select a data compression technique or to improve a data compression technique, for example.

Preferably, the method for analyzing the data set includes transforming the set of data elements by determining a state for a first data element in said set of data elements, selecting a mapping transformation from a set of mapping transformations corresponding to said determined state for said first data element, applying said selected transformation to a first transform element in said transform space to generate a transformation corresponding to said first data element, storing said transformation of said first transform element in said transform data space, determining a state for a next data element in said set of data elements, selecting a mapping transformation from said set of mapping transformations corresponding to said determined state for said next data element, applying said selected mapping transformation to a last stored transformation to generate a next transformation which represents said data elements from said first data element to said next data element, storing said next transformation representing said data elements in said transform data space, repeating said determining, selecting, and applying steps for each next data element following said first data element, and evaluating said stored transformations to determine whether said set of data elements have structure. By tracking the transformations stored in the transform data space, information may be obtained about the set of data elements and the methods that may be used to compress the data set.

For example, tracking the transformations in the transform data space may reveal an attractor for the data set in the transform data space. Many such attractors are well known and parameters associated with the appearance of such attractors may be used to modify the mapping transformers in the set of mapping transformations. The modified set of mapping transformations may be reapplied to the set of data elements and observation of the altered transformations in the transform data space may be evaluated to determine further information about the data set.

The inventive system which implements the method of the present invention includes a receiver for receiving data elements of a data set, a transformer, and a data transform memory. As the data elements are received, the receiver generates a signal indicative of the stat of the data element transformer and the transformer transforms a data element within the data transform memory in accordance with the signal generated by the receiver. This transformed data element is then stored in the data transform memory. Thus, the transformed data elements stored in the transform memory may reveal a pattern or non-uniformity which provides information about the data set comprised of the received data elements. The data elements in the transform memory may be used to drive a display or the like to reveal the transformations and any structure of those elements in the transform data space. Alternatively, a processor may determine a distribution parameter for the transformed data elements in the transform data space and compare the determined distribution parameter to a uniform distribution parameter for the transform data space to determine whether the data set may be compressed.

The information provided by the transformed data elements may be used to provide information about the data set without knowledge of the data elements of the data set. For example, the structure of the data set in the transform data space is a type of statistical fingerprint which may be used to identify the data set. Such statistical information may indicate a data set is comprised of character rather than numerical data and that the characters are English rather than some other language. As a result, a more efficient data representation format for the data set elements may be selected.

Information about the data set may also be used to improve compression of a data set. For example, the structure revealed in the data elements of the data transform space may provide insight into buffer sizes, code word lengths, and memory allocation needed for a compressor to efficiently compress a data set. Thus, the analysis made possible by the system and method of the present invention may be used to determine whether a data set can be compressed, the compression efficiency for a data set more accurately predicted, and the efficiency of a data compressor improved for a particular data set. All of this may be achieved without configuring a data compressor and then evaluating its efficiency by trial and error. As a result, a compression technique may be evaluated in an economical and efficient manner.

BRIEF DESCRIPTION OF THE DRAWINGS

The present invention may take form in various components and arrangement of components and in various steps and arrangement of steps. The drawings are only for purposes of illustrating a preferred embodiment and are not to be construed as limiting the invention.

DETAILED DESCRIPTION OF THE INVENTION

Figure 1:
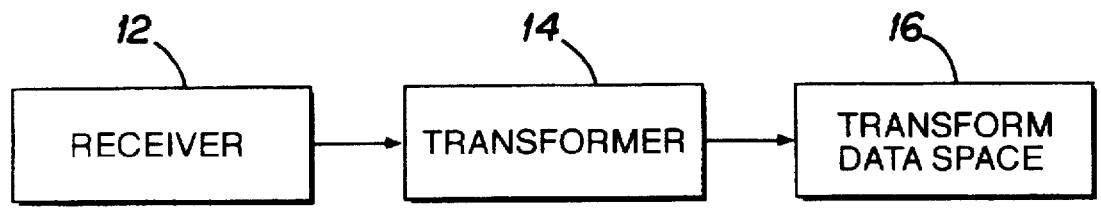
FIG. 1 is block diagram of a system of the present invention which may be used to analyze a data set.

An inventive system for transforming a data set so the structure of the transformed elements may be viewed to gain insight into the data set is shown in FIG. 1. That system includes a receiver 12, a data transformer 14 and a transform data space 16. Typically, receiver 12 is a disk device, buffer, or communication queue. The data elements for the set of data received by receiver 12 may be grouped in any manner to define an element state which may be used to drive transformer 14. For example, the data elements in receiver 12 may be provided to transformer 14 as bits, half bytes, bytes, or words of data or the like. As discussed in more detail below, transformer 14 responds to each possible state of the data elements provided to transformer 14 by generating data transformations of the elements in the transform data space 16. Transform data space 16 stores the data transformations generated by transformer 14 so the structure of the data transformations may be analyzed. Preferably, data space 16 permits visual viewing of the data transformations as discussed in more detail below.

Transformer 14 performs the function of transforming a data element within transform data space 16 to reflect the state of the latest data element received from receiver 12. This transformation is then stored in transform data space 16 so that transformer 14 may transform the transformation stored in data transform space 16 in response to the state of the next data element received from receiver 12.

Transformer 14 may be implemented by a variety of known devices such as a video camera for transforming light to electrical signals which may be stored in a transform data space such as a graphic output device or converted to binary data for storage in a conventional memory. Other examples of devices that may be used as transformer 14 are transducers or piezoelectric devices which convert other physical phenomena to electrical signals or the like. Preferably, transformer 14 is a computer system operating a program that maps data received by receiver 12 from a binary state domain to a graphical transform data space 16. Most preferably, the computer implements a number of mapping transformations, each of which corresponds to one of the possible states for each data element received from receiver 12. Each of the mapping transformations maps a transform data element from one location in the transform data memory to another location in the transform data memory.

Preferably, the system of FIG. 1 is implemented on a computer system having at least a standard (VGA) monitor, a 80486 processor supported with 8 MB of RAM and 200 MB of disk storage space. The preferred method of transforming received data elements is implemented in the C programming language supported by the DOS operating system.

Figure 2A:
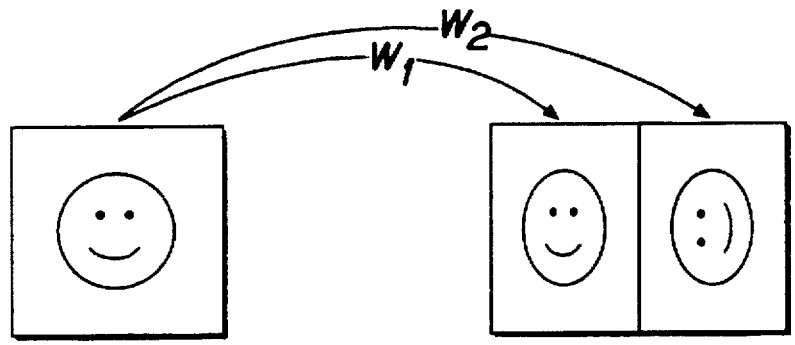
FIGS. 2A and 2B are illustrative examples of mapping transformations which may be used in the transformer of the system shown in FIG. 1.
Figure 2B:
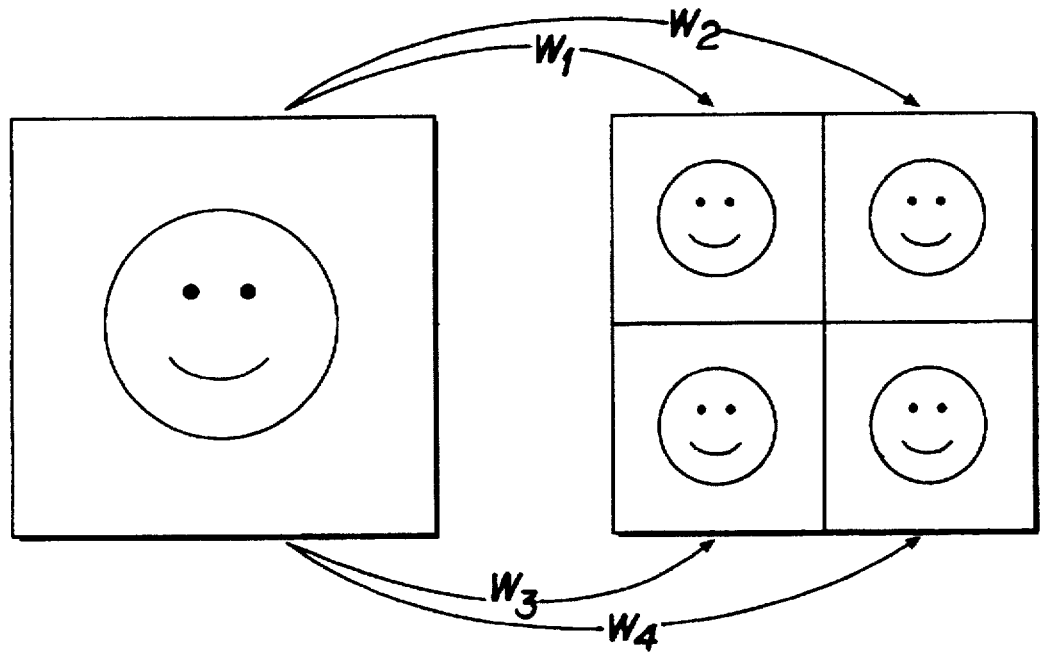

FIGS. 2A and 2B show examples of mapping transformations. Each of the mapping transformations is symbolically designated by $W_n$ where n equals 1, 2, 3 .... Each $W_n$ is a mapping transformation that maps a data transform element within the transform data space, DT. For example, in FIGS. 2A and 2B, the transform data space is the two dimensional Euclidean space. As represented in FIG. 2A, $W_1$ maps all points in the data transform space DT to the left-hand half of the data space DT and $W_2$ maps all of the transform points in the data transform space DT to the right-hand half of the transform data space. Of course, the invention may be applied to a dimension space of 1 or of degree 3 or higher and other data transformations may be used.

When data elements from a receiver are supplied as binary bits to transformer 14, the data elements may have two states, 0 or 1. Accordingly, transformer 14 implements two transformations, one of which corresponds to binary state 0 and the other corresponds to binary state 1. These transformations may be $W_1$ and $W_2$ as shown in FIG. 2A or some other set of data transformations. Transformer 14 initially selects any one of the data transform elements in the data transform space DT and applies a data transformation that corresponds to the state of the first received data element. Subsequent transformations are comprised of applying the data transformation that corresponds to the state of the latest data element received to the last data transformation stored in the data transform space. Thus, to continue the example, transformer 14 may select as an initial data transform element, an element near the lower left-hand corner of data transform space DT and, in response to a binary element having the value of 0, map the element to the left half portion by using $W_1$. If the binary value had been a 1, $W_2$ would have been used to map the selected data transform element to the right half portion of data transform space DT.

FIG. 2B shows mapping transformations $W_1$, $W_2$, $W_3$ and $W_4$, which may be used if data elements are provided as two bit components to transformer 14. Preferably, the transformations are affine map transformations of the form $ax+by+c$ where x and y are the coordinates of a data element to be transformed in a Euclidean space. Each transformation maps all points in the data transform space DT to a sub-region of the data transform space as indicated in FIG. 2B. Preferably, there is a one to one correspondence between the possible states of the data elements to be received and the number of data transformations.

Figure 3:
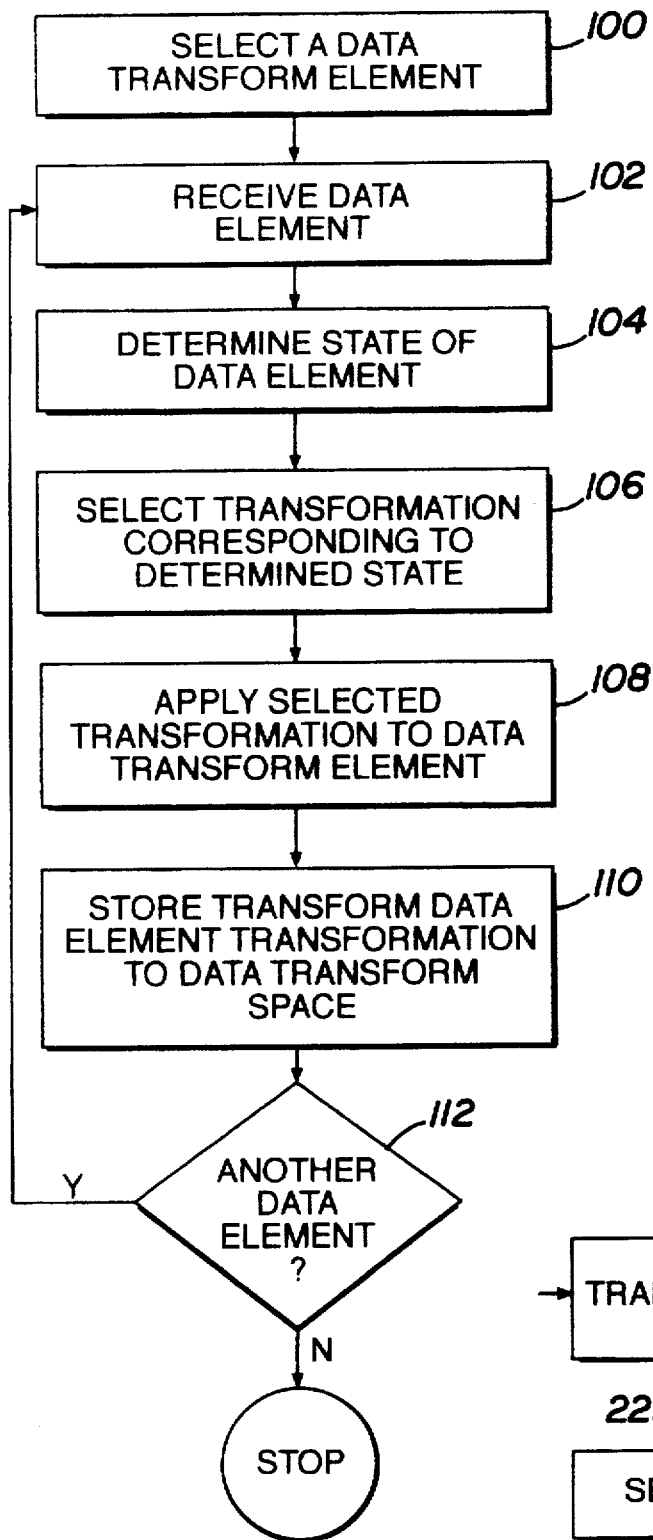
FIG. 3 is logic diagram of a process implemented in the system of FIG. 1 for data set analysis.

The preferred method implemented by transformer 14 is shown in FIG. 3. The process begins by selecting a data transform element within the data transform data space 16 (Step 100). The process then receives a first data element from receiver 12 and determines the state of the data element (Steps 102, 104). The process then selects a mapping transformation from a set of mapping transformations that corresponds to the state of the received data element (Step 106) and applies the selected mapping transformation to the selected transform element (Step 108). The data transformation transforms the element by mapping it to a different location within the data transform space. This transformation is then stored in data transform space 16 (Step 110). The process continues iteratively except that the selected mapping transformation that corresponds to the state of the next data element received is applied to the last transformation stored in the data transform space 16 at step 110.

The collection of transformed data elements which correspond to the states of the received data elements produced by this iterative process may be analyzed to derive information about the set of received data elements. As the transformations are stored in the data transform space, a pattern may develop which reveals structure within the received data elements not otherwise apparent from the received data elements themselves. This structure may be revealed by displaying the transformations on a monitor or the like. A person viewing the monitor may recognize a pattern or structure that provides insight into the content of the data set, its degree of compressibility or even a compression method which may effectively compress the data. This information is not otherwise obtainable save for the method and system of the present invention.

The process of transforming the data elements of one data space based on the states of the data elements in another data set provides a novel way of visualizing the correlation of the states of the symbols which comprise a data set or file with a data transform space. When the distribution of the transformations comprising the correlation are revealed in a graphical presentation, for example, then insight into the properties of the data set, such as its compressibility may be ascertained. Knowledge of these properties may be used to classify the data set for later processing or to design an efficient compressor for the data set.

When the transformations of the data transform space are displayed on a monitor or the like, the pattern may be observed by a person who may apply intuitive knowledge about the emerging pattern to modify the set of mapping transformations used by transformer 14. Thus, the system of the present invention is a type of data "oscilloscope". That is, it provides information about a data set through a graphical representation of the data set much as an oscilloscope represents an electrical signal so a person may evaluate the characteristics of the signal so it may be better treated, i.e., filtered, amplified, etc. Here, the pattern provided by a system of the present invention permits an observer to gain insight into a data set without direct observation of the data set itself. This information may be used to select a data format for representation of the data in storage, a compression method, or other data manipulation scheme.

Figure 4:
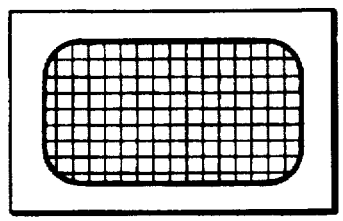
FIG. 4 depicts a visual aid to assist a viewer in evaluating structure in a data set transformation.

Other methods for testing the structure of the data transformations include imposing a geometric grid over a transform data space such as a viewing screen (shown in FIG. 4) so that the number of transform data elements within each domain formed by the grid members may be counted. If the number of transformations within one or more domains deviates from a median or norm for all of the domains by a significant factor, then the transformations are determined to have structure in the transform data space. This median or norm may sometimes be called a uniform distribution parameter. It may be a predetermined number or may be computed as the transformation of the transform data space is being performed. Likewise, the moments of a data set may be computed from the transformed data space elements using known techniques and analyzed to reveal properties of the data set.

Figure 5:
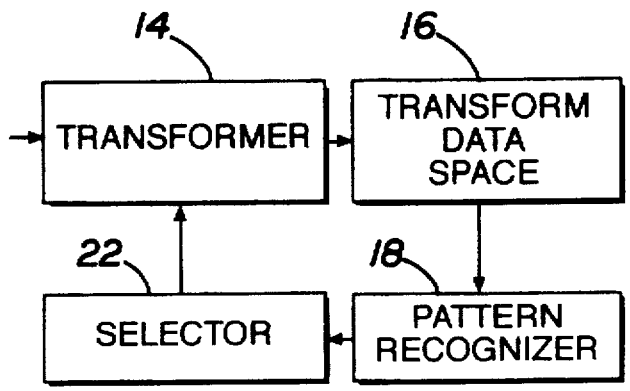
FIG. 5 is a block diagram of a system which utilizes information from a data set transformation of a data set to select a data compression technique best adapted for compressing a data set.

A system incorporating the system and method of the present invention is shown in FIG. 5. That system includes the transformer 14, transform data space 16, pattern recognizer 18, and method selector 22. In the system shown in FIG. 5, predetermined sets of mapping transformations are stored within mapping selector 22. Transformer 14 is provided with a set of data transformations by method selector 22 and transforms data elements with data transform space 16 by applying the data transformations from the provided set which correspond to the states of the data elements being input to transformer 14. The pattern recognizer 18 may be a visual viewing device so an operator may observe the transformations for structure or pattern recognizer 18 may include a grid histogram which may be evaluated to detect the lack or presence of uniform distribution of the data transform elements in the transform space.

Preferably, pattern recognizer 18 includes a database comprised of transformations of data transform spaces generated by using the states of previous sets of data elements. This database of empirical information may then be compared to the data transform space currently being constructed to determine whether such a transformation has been previously stored. The information for the stored transformations includes the transformation set which was used to generate it as well as information about the data set used to transform the data transform space. For example, should pattern recognizer 18 determine that a previously stored transformation is similar to the data transform space currently being constructed, the information about the stored transformation may indicate that the data set which generated the stored transformation was character data for a particular language. As a result, the probability that the data set being analyzed is also character data for that same language becomes significant. In response, pattern recognizer 18 may select the transformation set previously used to generate the stored transformation, if different from the one currently being used by transformer 14, and transfer that transformation set to transformer 14. Using the new set of data transformations, transformer 14 may generate a new transformation using the states of the data set being analyzed which provides even more information about the data set being analyzed.

Alternatively, pattern recognizer 18 may simply analyze whether the transformation is uniform or not and determine, for example, that non-uniformity indicates that the data set may be further compressed. This information about the data set may be used by selector 22 to select another set of data transformations to compress the data, for example, or the operator may control selection of a data transformation set through a keyboard or other known input device. For example, if the operator or pattern recognizer 18 detect the appearance of an attractor in the data transform space, then a set of mapping transformations which produce the attractor may be loaded into transformer 14 and the data set reevaluated to analyze the resulting transformations.

While the present invention has been illustrated by the description of a preferred and alternative embodiments and processes, and while the preferred and alternative embodiments and processes have been described in considerable detail, it is not the intention of the applicant to restrict or in any way limit the scope of the appended claims to such detail. Additional advantages and modifications will readily appear to those skilled in the art. The invention in its broadest aspects is therefore not limited to the specific details, preferred embodiment, and illustrative examples shown and described. Accordingly, departures may be made from such details without departing from the spirit or scope of applicant's general inventive concept.

What is claimed is:

1. A method for analyzing a set of data elements, comprising the steps of:

determining a state for a first data element in a set of data elements;

selecting a mapping transformation from a set of mapping transformations corresponding to said determined state for said first data element;

applying said selected transformation to a first transform element in a transform data space to generate a transformation in said transform data space;

storing said transformation of said/first transform element;

determining a state for a next data element in said set of data elements;

selecting a mapping transformation from said set of mapping transformations corresponding to said determined state for said next data element;

applying said selected mapping transformation to a last stored transformation to generate a transformation of said last stored transformation;

storing said generated transformation;

repeating said determining, selecting, and applying steps for each next data element following said first data element;

displaying said transform data space;

displaying said transformations within said displayed transform data space;

comparing, said displayed transformations to transformations of said data transform space generated from other data sets; and detecting from said comparisons whether said transformations displayed in said transform data space conform to one of said transformations generated from said other data sets.

2. A system for analyzing a set of data elements, comprising:

means for determining a state for each data element in a set of data elements;

means for selecting a mapping transformation from a set or mapping transformations in correspondence with said determined states for said data elements;

means for applying said selected mapping transformation to a data element in a transform data space to generate a transformation;

means for storing said generated transformations in said transform data space, means for iteratively operating said determining means, said selecting means, said applying means, and said storing means so the state for each data element is used to transform a data transform element in said transform data space;

means for displaying said transform data space;

means for displaying said transformations within said displayed transform data space;

means for comparing said displayed transformations to transformations of said data transform space generated from other data sets; and means for detecting whether said transformations displayed in said transform data space conform to one of said transformations generated from said other data sets.

* * * * *

UNITED STATES PATENT AND TRADEMARK OFFICE
CERTIFICATE OF CORRECTION

PATENT NO. : 5,717,788
DATED : February 10, 1998
INVENTOR(S) : Barnsley

It is certified that error appears in the above-identified patent and that said Letters Patent is hereby corrected as shown below:

column 3, line 57 should read "...generates a signal indicative of the state of the data element..."

Signed and Sealed this

Ninth Day of June, 1998

Attest:

BRUCE LEHMAN

Attesting Officer

Commissioner of Patents and Trademarks